Feb. 11, 1936.    W. U. GRIFFITHS    2,030,510
FAUCET
Original Filed Sept. 18, 1933
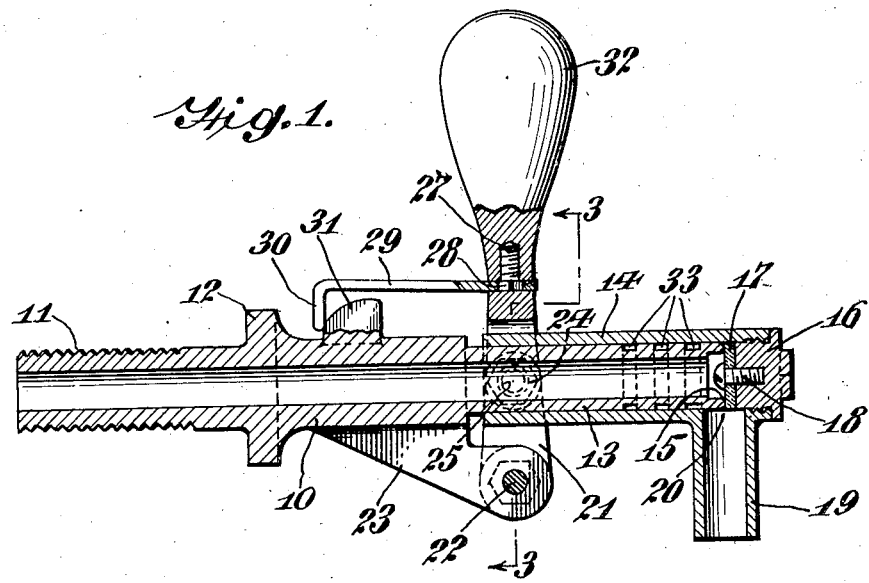
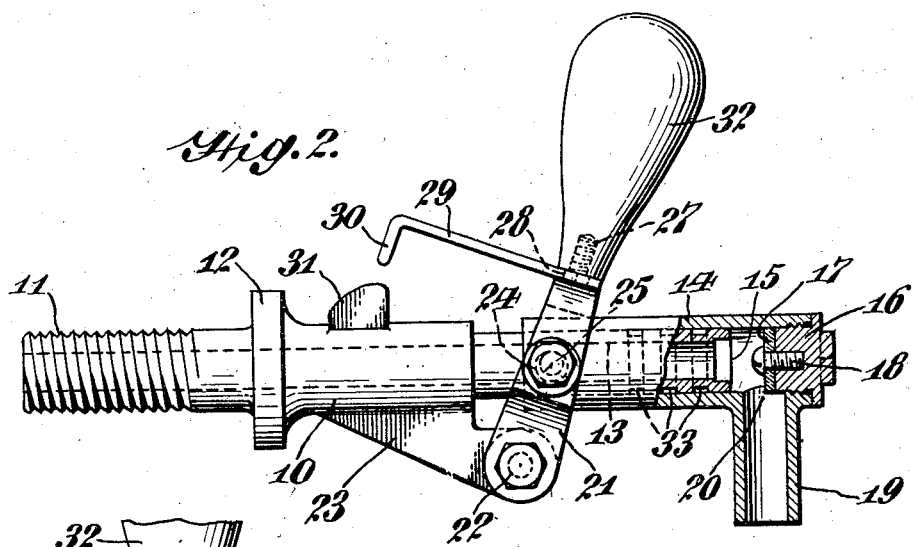
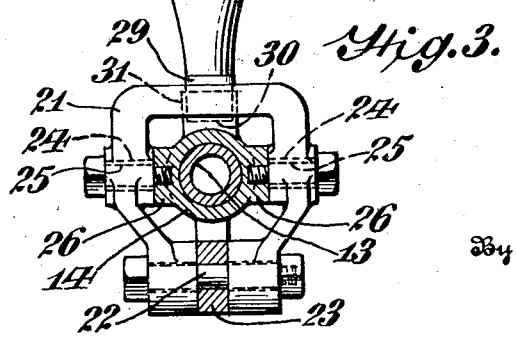
Inventor
William U. Griffiths,
By John D. Myers
Attorney Patented Feb. 11, 1936

2,030,510

UNITED STATES PATENT OFFICE 2,030,510

FAUCET

William U. Griffiths, Philadelphia, Pa.

Application September 18, 1933, Serial No. 689,838
Renewed July 2, 1935

2 Claims. (Cl. 251—8)

This invention relates to a faucet and involves an improved device of this character, designed particularly for dispensing beer and other liquids under low pressure and having a tendency to foam when drawn.

One of the objects of the invention is the provision of a faucet in which there is substantially no impediment to the discharge of a liquid therefrom when the valve element is in its open position. A further object of the invention is the provision of a faucet which is so constructed as to substantially decrease the amount of foam in the liquid drawn therefrom. A still further object of the invention is the provision of a faucet which is simple in construction, may be manufactured cheaply, and is unlikely to become damaged even though subjected to hard usage.

Still other objects and advantages of the invention will be apparent from the following description, taken with the drawing, wherein:

Fig. 1 is a longitudinal vertical sectional view of my improved faucet showing the valve thereof in closed position;

Fig. 2 is a side elevational view of the faucet, partly in section, and showing the valve in open position; and Fig. 3 is a transverse sectional view taken on the line 3—3 of Fig. 1.

My improved construction comprises a body member 10 which is substantially tubular in form, and as is usual with faucets or spigots of this general character, is threaded on the inner end thereof at 11 and provided with a laterally extending flange 12 by means of which the faucet may be connected to a suitable supply pipe. The outer end of the tubular body member 10 is preferably reduced slightly in diameter as shown at 13.

A sleeve 14 is mounted on the reduced portion 13 of the tubular body member for sliding movement longitudinally thereof. The outer end of the sleeve 14 extends outwardly beyond the valve seat 15 formed on the outer end of the tubular body member, and is threaded on the interior thereof for the reception of a removable threaded plug 16 which serves both to close the outer end of the sleeve 14 and as a valve member for engagement with the valve seat 15 to close the outer end of the tubular body member when the sleeve is moved inwardly thereon. A spigot washer 17 of the usual form is preferably mounted on the inner end of the plug 16 and is held thereon by means of a screw 18.

A lateral spout 19 near the outer end of the sleeve 14 is so located with respect to the sleeve and the outer end of the tubular body member 10 as to provide a continuous open passage from the tubular body member through the spout when the sleeve is in its outermost position. Preferably the length of the plug 16 is such as to extend partially across the opening 20 from the sleeve 14 into the spout 19, such an arrangement of the plug tending to direct the liquid from the outer end of the tubular member into the spout without producing an undue amount of foam on the dispensed liquid.

While various means may be provided for reciprocating the sleeve 14 upon the tubular body member 10 for the purpose of moving the plug or valve element 16 to and from the valve seat 15 formed on the outer end of the tubular member 10, as shown herein I have provided a yoke 21 the lower spaced ends of which are pivoted upon a bolt 22 extending through a projection or bracket 23 extending downwardly from the intermediate portion of the tubular body member 10. The opposite intermediate portions of the yoke 21 are provided with enlarged openings 24 for the reception of bolts 25 the inner ends of which are threaded into suitable openings in bosses 26 on the reciprocating sleeve 14. With the structure herein disclosed, the openings 24 through which the bolts 25 extend are somewhat larger than the bolts in order to provide for the necessary movement of the yoke 21 as it pivots about the bolt 22 by which the lower ends of the yoke are secured to the projecting bracket 23.

The upper end of the yoke 21 is provided with a threaded projection 27 a portion of which is preferably squared adjacent the yoke as shown at 28 for the reception of one end of a spring latch 29 the opposite end of which is provided with a hook portion 30 for engagement with a beveled keeper 31 projecting upwardly from the intermediate portion of the tubular body member 10. A handle 32 is provided with a threaded opening in the lower end thereof for engagement with the threaded projection 27, and, as will be clear from Figs. 1 and 2 of the drawing, the handle serves as an operating means for the reciprocating sleeve 14 and the valve element 16 carried thereby, and also secures the spring latch 29 on the yoke 21.

The construction of the sleeve 14 and the reduced outer portion 13 of the tubular body member is such that the inner diameter of the sleeve is only slightly greater than the outer diameter of the reduced outer portion 13 in order to provide an easy reciprocating movement of the sleeve on the tubular body member. While there is substantially no backward pressure to force the discharged liquid between the sleeve and the tubular body member, it is preferable to provide the tubular body member with a plurality of spaced annular groves 33. These grooves become filled with the liquid which is being dispensed, and the liquid in the grooves thereby forms a seal which operates to prevent leakage of liquid between the sleeve and the tubular body member when the valve element is in a partly closed position.

As will be clear from the embodiment of the invention illustrated in the drawing, when the sleeve and the valve element carried thereby are moved into their innermost positions by means of the handle, the valve element cooperates with the valve seat on the outer end of the tubular body member, and the hook portion on the spring latch moves into engagement with the keeper to retain the valve in its closed position against the pressure of the liquid being dispensed. When the handle is moved outwardly, the hook portion of the latch is readily disengaged from the keeper so as to permit the sleeve to be freely moved outwardly on the tubular body member and thereby open the valve for the discharge of liquid therethrough. When the valve is in its open position, an unobstructed passageway is provided for the liquid so that it is dispensed without the formation of an excessive amount of foam as in the case of many of the faucets heretofore used.

While I have disclosed herein one form which my invention may take, it is to be understood that various changes may be made therein so long as they come within the scope of the claims appended hereto.

Having thus described my invention, what I desire to claim by Letters Patent is:

1. In a faucet structure, a tubular body member having a valve seat on one end thereof, a reciprocating sleeve mounted on said body member and having its outer end extending beyond said valve seat, a lateral spout on said sleeve near the outer end thereof, a valve in the outer end of the said sleeve for engagement with said valve seat upon the inward movement of said sleeve, a lateral projection on one side of said body member near the inner end of said sleeve, a pivoted yoke member having the free ends thereof connected to said projection and the intermediate portion connected to said sleeve to effect reciprocation thereof, a handle on said yoke, a beveled keeper on said body member opposite said projection, and a flat spring latch on said yoke having a hook on the free end thereof movable into and out of engagement with said keeper upon manipulation of said handle to hold said valve in closed position and release the same.

2. In a faucet structure, a tubular body member, a reciprocating sleeve mounted on said body member, a pivoted yoke member having the free ends thereof supported on one side of said tubular body member and the intermediate portion connected to said sleeve to effect reciprocation of said sleeve with respect to said tubular body member upon movement of said yoke, a handle on said yoke, a beveled keeper on said body member, and a leaf spring latch on said yoke having a hook on the free end thereof movable into and out of engagement with said keeper upon manipulation of said handle.

WILLIAM U. GRIFFITHS.